US009834146B2

(12) United States Patent
VanderPloeg et al.

(10) Patent No.: US 9,834,146 B2
(45) Date of Patent: Dec. 5, 2017

(54) AUTOMATIC DISPLAY MIRROR ASSEMBLY

(71) Applicant: Gentex Corporation, Zeeland, MI (US)

(72) Inventors: John A. VanderPloeg, Zeeland, MI (US); Mark A. VanVuuren, Dorr, MI (US); Ethan J. Lee, Byron Center, MI (US)

(73) Assignee: GENTEX CORPORATION, Zeeland, MI (US)

(*) Notice: Subject to any disclaimer, the term of this patent is extended or adjusted under 35 U.S.C. 154(b) by 58 days.

(21) Appl. No.: 14/676,093

(22) Filed: Apr. 1, 2015

(65) Prior Publication Data

US 2015/0277203 A1 Oct. 1, 2015

Related U.S. Application Data

(60) Provisional application No. 61/973,447, filed on Apr. 1, 2014.

(51) Int. Cl.
*G02F 1/13* (2006.01)
*B60R 1/08* (2006.01)

(52) U.S. Cl.
CPC .................. *B60R 1/088* (2013.01)

(58) Field of Classification Search
CPC .. G02F 1/163; G02F 1/133553; G01J 1/4204; B60R 1/088
USPC ........................................................ 349/195
See application file for complete search history.

(56) References Cited

U.S. PATENT DOCUMENTS 2,131,888 A 10/1938 Harris
2,632,040 A 3/1953 Rabinow
2,827,594 A 3/1958 Rabinow
3,179,845 A 4/1965 Kulwiec
3,581,276 A 5/1971 Newman
3,663,819 A 5/1972 Hicks et al.
(Continued)

FOREIGN PATENT DOCUMENTS

EP 0513476 11/1992
EP 0899157 B1 10/2004
(Continued)

OTHER PUBLICATIONS

Palalau et al., "FPD Evaluation for Automotive Application," Proceedings of the Vehicle Display Symposium, Nov. 2, 1995, pp. 97-103, Society for Information Display, Detroit Chapter, Santa Ana, CA.
(Continued)

*Primary Examiner* — Charles Chang
(74) *Attorney, Agent, or Firm* — Price Heneveld LLP; Bradley D. Johnson

(57) ABSTRACT

A display mirror assembly for a vehicle includes an electrochromic cell, a switchable reflective element, a display module, an ambient light sensor, and a controller. The controller automatically selects a display mode or a mirror mode in response to a detected ambient light level. In a display mode, the controller activates the display module, sets the switchable reflective element to a low reflection mode, and sets the electrochromic cell to a clear state with minimum attenuation. In a mirror mode, the controller deactivates the display module, sets the switchable reflective element to a high reflection mode, and varies attenuation by the electrochromic cell.

20 Claims, 8 Drawing Sheets

(56) References Cited

U.S. PATENT DOCUMENTS

| | | |
|---|---|---|
| 4,109,235 A | 8/1978 | Bouthors |
| 4,139,801 A | 2/1979 | Linares |
| 4,151,526 A | 4/1979 | Hinachi et al. |
| 4,214,266 A | 7/1980 | Myers |
| 4,236,099 A | 11/1980 | Rosenblum |
| 4,257,703 A | 3/1981 | Goodrich |
| 4,258,979 A | 3/1981 | Mahin |
| 4,277,804 A | 7/1981 | Robison |
| 4,286,308 A | 8/1981 | Wolff |
| 4,310,851 A | 1/1982 | Pierrat |
| 4,357,558 A | 11/1982 | Massoni et al. |
| 4,376,909 A | 3/1983 | Tagami et al. |
| 4,479,173 A | 10/1984 | Rumpakis |
| 4,499,451 A | 2/1985 | Suzuki et al. |
| 4,599,544 A | 7/1986 | Martin |
| 4,638,287 A | 1/1987 | Umebayashi et al. |
| 4,645,975 A | 2/1987 | Meitzler et al. |
| 4,665,321 A | 5/1987 | Chang et al. |
| 4,665,430 A | 5/1987 | Hiroyasu |
| 4,692,798 A | 9/1987 | Seko et al. |
| 4,716,298 A | 12/1987 | Etoh |
| 4,727,290 A | 2/1988 | Smith et al. |
| 4,740,838 A | 4/1988 | Mase et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,910,591 A | 3/1990 | Petrossian et al. |
| 4,930,742 A | 6/1990 | Schofield et al. |
| 4,934,273 A | 6/1990 | Endriz |
| 4,967,319 A | 10/1990 | Seko |
| 5,005,213 A | 4/1991 | Hanson et al. |
| 5,008,946 A | 4/1991 | Ando |
| 5,027,200 A | 6/1991 | Petrossian et al. |
| 5,036,437 A | 7/1991 | Macks |
| 5,072,154 A | 12/1991 | Chen |
| 5,086,253 A | 2/1992 | Lawler |
| 5,096,287 A | 3/1992 | Kakinami et al. |
| 5,121,200 A | 6/1992 | Choi et al. |
| 5,124,549 A | 6/1992 | Michaels et al. |
| 5,166,681 A | 11/1992 | Bottesch et al. |
| 5,182,502 A | 1/1993 | Slotkowski et al. |
| 5,187,383 A | 2/1993 | Taccetta et al. |
| 5,197,562 A | 3/1993 | Kakinami et al. |
| 5,230,400 A | 7/1993 | Kakainami et al. |
| 5,235,178 A | 8/1993 | Hegyi |
| 5,243,417 A | 9/1993 | Pollard |
| 5,289,321 A | 2/1994 | Secor |
| 5,296,924 A | 3/1994 | de Saint Blancard et al. |
| 5,304,980 A | 4/1994 | Maekawa |
| 5,329,206 A | 7/1994 | Slotkowski et al. |
| 5,347,261 A | 9/1994 | Adell |
| 5,347,459 A | 9/1994 | Greenspan et al. |
| 5,355,146 A | 10/1994 | Chiu et al. |
| 5,379,104 A | 1/1995 | Takao |
| 5,386,285 A | 1/1995 | Asayama |
| 5,396,054 A | 3/1995 | Krichever et al. |
| 5,402,170 A | 3/1995 | Parulski et al. |
| 5,408,357 A | 4/1995 | Beukema |
| 5,414,461 A | 5/1995 | Kishi et al. |
| 5,416,318 A | 5/1995 | Hegyi |
| 5,418,610 A | 5/1995 | Fischer |
| 5,424,952 A | 6/1995 | Asayama |
| 5,426,294 A | 6/1995 | Kobayashi et al. |
| 5,428,464 A | 6/1995 | Silverbrook |
| 5,430,450 A | 7/1995 | Holmes |
| 5,434,407 A | 7/1995 | Bauer et al. |
| 5,451,822 A | 9/1995 | Bechtel et al. |
| 5,452,004 A | 9/1995 | Roberts |
| 5,469,298 A | 11/1995 | Suman et al. |
| 5,471,515 A | 11/1995 | Fossum et al. |
| 5,475,441 A | 12/1995 | Parulski et al. |
| 5,475,494 A | 12/1995 | Nishida et al. |
| 5,481,268 A | 1/1996 | Higgins |
| 5,483,346 A | 1/1996 | Butzer |
| 5,483,453 A | 1/1996 | Uemura et al. |
| 5,485,155 A | 1/1996 | Hibino |
| 5,485,378 A | 1/1996 | Franke et al. |
| 5,488,496 A | 1/1996 | Pine |
| 5,508,592 A | 4/1996 | Lapatovich et al. |
| 5,515,448 A | 5/1996 | Nishitani |
| 5,523,811 A | 6/1996 | Wada et al. |
| 5,530,421 A | 6/1996 | Marshall et al. |
| 5,535,144 A | 7/1996 | Kise |
| 5,537,003 A | 7/1996 | Bechtel et al. |
| 5,541,590 A | 7/1996 | Nishio |
| 5,541,724 A | 7/1996 | Hoashi |
| 5,550,677 A | 8/1996 | Schofield et al. |
| 5,554,912 A | 9/1996 | Thayer et al. |
| 5,574,443 A | 11/1996 | Hsieh |
| 5,574,463 A | 11/1996 | Shirai et al. |
| 5,576,975 A | 11/1996 | Sasaki et al. |
| 5,587,929 A | 12/1996 | League et al. |
| 5,592,146 A | 1/1997 | Kover, Jr. et al. |
| 5,602,542 A | 2/1997 | Windmann et al. |
| 5,614,788 A | 3/1997 | Mullins et al. |
| 5,615,023 A | 3/1997 | Yang |
| 5,617,085 A | 4/1997 | Tsutsumi et al. |
| 5,621,460 A | 4/1997 | Hatlestad et al. |
| 5,634,709 A | 6/1997 | Iwama |
| 5,642,238 A | 6/1997 | Sala |
| 5,646,614 A | 7/1997 | Abersfelder et al. |
| 5,650,765 A | 7/1997 | Park |
| 5,660,454 A | 8/1997 | Mori et al. |
| 5,666,028 A | 9/1997 | Bechtel et al. |
| 5,670,935 A | 9/1997 | Schofield et al. |
| 5,680,123 A | 10/1997 | Lee |
| 5,684,473 A | 11/1997 | Hibino et al. |
| 5,707,129 A | 1/1998 | Kobayashi |
| 5,708,410 A | 1/1998 | Blank et al. |
| 5,708,857 A | 1/1998 | Ishibashi |
| 5,710,565 A | 1/1998 | Shirai et al. |
| 5,714,751 A | 2/1998 | Chen |
| 5,715,093 A | 2/1998 | Schierbeek et al. |
| 5,729,194 A | 3/1998 | Spears et al. |
| 5,736,816 A | 4/1998 | Strenke et al. |
| 5,745,050 A | 4/1998 | Nakagawa |
| 5,751,211 A | 5/1998 | Shirai et al. |
| 5,751,832 A | 5/1998 | Panter et al. |
| 5,754,099 A | 5/1998 | Nishimura et al. |
| 5,760,828 A | 6/1998 | Cortes |
| 5,764,139 A | 6/1998 | Nojima et al. |
| 5,767,793 A | 6/1998 | Agravante et al. |
| 5,781,105 A | 7/1998 | Bitar et al. |
| 5,786,787 A | 7/1998 | Eriksson et al. |
| 5,793,308 A | 8/1998 | Rosinski et al. |
| 5,793,420 A | 8/1998 | Schmidt |
| 5,796,094 A | 8/1998 | Schofield et al. |
| 5,798,727 A | 8/1998 | Shirai et al. |
| 5,811,888 A | 9/1998 | Hsieh |
| 5,812,321 A | 9/1998 | Schierbeek et al. |
| 5,837,994 A | 11/1998 | Stam et al. |
| 5,841,126 A | 11/1998 | Fossum et al. |
| 5,844,505 A | 12/1998 | Van Ryzin |
| 5,845,000 A | 12/1998 | Breed et al. |
| 5,850,176 A | 12/1998 | Kinoshita et al. |
| 5,867,214 A | 2/1999 | Anderson et al. |
| 5,877,897 A | 3/1999 | Schofield et al. |
| 5,883,739 A | 3/1999 | Ashihara et al. |
| 5,904,729 A | 5/1999 | Ruzicka |
| 5,905,457 A | 5/1999 | Rashid |
| 5,912,534 A | 6/1999 | Benedict |
| 5,923,027 A | 7/1999 | Stam et al. |
| 5,935,613 A | 8/1999 | Benham et al. |
| 5,940,011 A | 8/1999 | Agravante et al. |
| 5,942,853 A | 8/1999 | Piscart |
| 5,949,331 A | 9/1999 | Schofield et al. |
| 5,956,079 A | 9/1999 | Ridgley |
| 5,956,181 A | 9/1999 | Lin |
| 5,959,555 A | 9/1999 | Furuta |
| 5,990,469 A | 11/1999 | Bechtel et al. |
| 6,008,486 A | 12/1999 | Stam et al. |
| 6,009,359 A | 12/1999 | El-Hakim et al. |
| 6,018,308 A | 1/2000 | Shirai |
| 6,025,872 A | 2/2000 | Ozaki et al. |

(56) References Cited

U.S. PATENT DOCUMENTS

| | | |
|---|---|---|
| 6,046,766 A | 4/2000 | Sakata |
| 6,049,171 A | 4/2000 | Stam et al. |
| 6,060,989 A | 5/2000 | Gehlot |
| 6,061,002 A | 5/2000 | Weber et al. |
| 6,067,111 A | 5/2000 | Hahn et al. |
| 6,072,391 A | 6/2000 | Suzuki et al. |
| 6,078,355 A | 6/2000 | Zengel |
| 6,097,023 A | 8/2000 | Schofield et al. |
| 6,102,546 A | 8/2000 | Carter |
| 6,106,121 A | 8/2000 | Buckley et al. |
| 6,111,498 A | 8/2000 | Jobes et al. |
| 6,115,651 A | 9/2000 | Cruz |
| 6,122,597 A | 9/2000 | Saneyoshi et al. |
| 6,128,576 A | 10/2000 | Nishimoto et al. |
| 6,130,421 A | 10/2000 | Bechtel et al. |
| 6,130,448 A | 10/2000 | Bauer et al. |
| 6,140,933 A | 10/2000 | Bugno et al. |
| 6,144,158 A | 11/2000 | Beam |
| 6,151,065 A | 11/2000 | Steed et al. |
| 6,151,539 A | 11/2000 | Bergholz et al. |
| 6,154,149 A | 11/2000 | Tychkowski et al. |
| 6,157,294 A | 12/2000 | Urai et al. |
| 6,166,628 A | 12/2000 | Andreas |
| 6,166,698 A | 12/2000 | Turnbull et al. |
| 6,167,755 B1 | 1/2001 | Damson et al. |
| 6,172,600 B1 | 1/2001 | Kakinami et al. |
| 6,172,601 B1 | 1/2001 | Wada et al. |
| 6,175,300 B1 | 1/2001 | Kendrick |
| 6,184,781 B1 | 2/2001 | Ramakesavan |
| 6,185,492 B1 | 2/2001 | Kagawa et al. |
| 6,191,704 B1 | 2/2001 | Takenaga et al. |
| 6,200,010 B1 | 3/2001 | Anders |
| 6,218,934 B1 | 4/2001 | Regan |
| 6,222,447 B1 | 4/2001 | Schofield et al. |
| 6,249,214 B1 | 6/2001 | Kashiwazaki |
| 6,250,766 B1 | 6/2001 | Strumolo et al. |
| 6,255,639 B1 | 7/2001 | Stam et al. |
| 6,259,475 B1 | 7/2001 | Ramachandran et al. |
| 6,265,968 B1 | 7/2001 | Betzitza et al. |
| 6,268,803 B1 | 7/2001 | Gunderson et al. |
| 6,269,308 B1 | 7/2001 | Kodaka et al. |
| 6,281,632 B1 | 8/2001 | Stam et al. |
| 6,281,804 B1 | 8/2001 | Haller et al. |
| 6,289,332 B2 | 9/2001 | Menig et al. |
| 6,300,879 B1 | 10/2001 | Regan et al. |
| 6,304,173 B2 | 10/2001 | Pala et al. |
| 6,317,057 B1 | 11/2001 | Lee |
| 6,320,612 B1 | 11/2001 | Young |
| 6,324,295 B1 | 11/2001 | Valery et al. |
| 6,329,925 B1 | 12/2001 | Skiver et al. |
| 6,330,511 B2 | 12/2001 | Ogura et al. |
| 6,335,680 B1 | 1/2002 | Matsuoka |
| 6,344,805 B1 | 2/2002 | Yasui et al. |
| 6,348,858 B2 | 2/2002 | Weis et al. |
| 6,349,782 B1 | 2/2002 | Sekiya et al. |
| 6,356,206 B1 | 3/2002 | Takenaga et al. |
| 6,356,376 B1 | 3/2002 | Tonar et al. |
| 6,357,883 B1 | 3/2002 | Strumolo et al. |
| 6,363,326 B1 | 3/2002 | Scully |
| 6,369,701 B1 | 4/2002 | Yoshida et al. |
| 6,379,013 B1 | 4/2002 | Bechtel et al. |
| 6,396,040 B1 | 5/2002 | Hill |
| 6,396,397 B1 | 5/2002 | Bos et al. |
| 6,403,942 B1 | 6/2002 | Stam |
| 6,408,247 B1 | 6/2002 | Ichikawa et al. |
| 6,412,959 B1 | 7/2002 | Tseng |
| 6,415,230 B1 | 7/2002 | Maruko et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,892 B1 | 7/2002 | Matsuoka |
| 6,428,172 B1 | 8/2002 | Hutzel et al. |
| 6,433,680 B1 | 8/2002 | Ho |
| 6,437,688 B1 | 8/2002 | Kobayashi |
| 6,438,491 B1 | 8/2002 | Farmer |
| 6,441,872 B1 | 8/2002 | Ho |
| 6,442,465 B2 | 8/2002 | Breed et al. |
| 6,443,602 B1 | 9/2002 | Tanabe et al. |
| 6,447,128 B1 | 9/2002 | Lang et al. |
| 6,452,533 B1 | 9/2002 | Yamabuchi et al. |
| 6,463,369 B2 | 10/2002 | Sadano et al. |
| 6,465,962 B1 | 10/2002 | Fu et al. |
| 6,466,701 B1 | 10/2002 | Ejiri et al. |
| 6,469,739 B1 | 10/2002 | Bechtel et al. |
| 6,472,977 B1 | 10/2002 | Pochmuller |
| 6,473,001 B1 | 10/2002 | Blum |
| 6,476,731 B1 | 11/2002 | Miki et al. |
| 6,476,855 B1 | 11/2002 | Yamamoto |
| 6,483,429 B1 | 11/2002 | Yasui et al. |
| 6,483,438 B2 | 11/2002 | DeLine et al. |
| 6,487,500 B2 | 11/2002 | Lemelson et al. |
| 6,491,416 B1 | 12/2002 | Strazzanti |
| 6,498,620 B2 | 12/2002 | Schofield et al. |
| 6,501,387 B2 | 12/2002 | Skiver et al. |
| 6,507,779 B2 | 1/2003 | Breed et al. |
| 6,515,581 B1 | 2/2003 | Ho |
| 6,515,597 B1 | 2/2003 | Wada et al. |
| 6,520,667 B1 | 2/2003 | Mousseau |
| 6,522,969 B2 | 2/2003 | Kannonji |
| 6,542,085 B1 | 4/2003 | Yang |
| 6,542,182 B1 | 4/2003 | Chutorash |
| 6,545,598 B1 | 4/2003 | De Villeroche |
| 6,550,943 B2 | 4/2003 | Strazzanti |
| 6,553,130 B1 | 4/2003 | Lemelson et al. |
| 6,558,026 B2 | 5/2003 | Strazzanti |
| 6,559,761 B1 | 5/2003 | Miller et al. |
| 6,572,233 B1 | 6/2003 | Northman et al. |
| 6,575,643 B2 | 6/2003 | Takahashi |
| 6,580,373 B1 | 6/2003 | Ohashi |
| 6,581,007 B2 | 6/2003 | Hasegawa et al. |
| 6,583,730 B2 | 6/2003 | Lang et al. |
| 6,587,573 B1 | 7/2003 | Stam et al. |
| 6,591,192 B2 | 7/2003 | Okamura et al. |
| 6,594,583 B2 | 7/2003 | Ogura et al. |
| 6,594,614 B2 | 7/2003 | Studt et al. |
| 6,611,202 B2 | 8/2003 | Schofield et al. |
| 6,611,227 B1 | 8/2003 | Nebiyeloul-Kifle |
| 6,611,610 B1 | 8/2003 | Stam et al. |
| 6,611,759 B2 | 8/2003 | Brosche |
| 6,614,387 B1 | 9/2003 | Deadman |
| 6,616,764 B2 | 9/2003 | Kramer et al. |
| 6,617,564 B2 | 9/2003 | Ockerse et al. |
| 6,618,672 B2 | 9/2003 | Sasaki et al. |
| 6,630,888 B2 | 10/2003 | Lang et al. |
| 6,631,316 B2 | 10/2003 | Stam et al. |
| 6,636,258 B2 | 10/2003 | Strumolo |
| 6,642,840 B2 | 11/2003 | Lang et al. |
| 6,642,851 B2 | 11/2003 | Deline et al. |
| 6,648,477 B2 | 11/2003 | Hutzel et al. |
| 6,665,592 B2 | 12/2003 | Kodama |
| 6,670,207 B1 | 12/2003 | Roberts |
| 6,670,910 B2 | 12/2003 | Delcheccolo et al. |
| 6,674,370 B2 | 1/2004 | Rodewald et al. |
| 6,675,075 B1 | 1/2004 | Engelsberg et al. |
| 6,677,986 B1 | 1/2004 | Pöchmüller |
| 6,683,539 B2 | 1/2004 | Trajkovic et al. |
| 6,683,969 B1 | 1/2004 | Nishigaki et al. |
| 6,690,268 B2 | 2/2004 | Schofield et al. |
| 6,690,413 B1 | 2/2004 | Moore |
| 6,693,517 B2 | 2/2004 | McCarty et al. |
| 6,693,518 B2 | 2/2004 | Kumata |
| 6,693,519 B2 | 2/2004 | Keirstead |
| 6,693,524 B1 | 2/2004 | Payne |
| 6,717,610 B1 | 4/2004 | Bos et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,737,964 B2 | 5/2004 | Samman et al. |
| 6,738,088 B1 | 5/2004 | Uskolovsky et al. |
| 6,744,353 B2 | 6/2004 | Sjonell |
| 6,772,057 B2 | 8/2004 | Breed et al. |
| 6,774,988 B2 | 8/2004 | Stam et al. |
| 6,846,098 B2 | 1/2005 | Bourdelais et al. |

(56) References Cited

U.S. PATENT DOCUMENTS

| | | | |
|---|---|---|---|
| 6,847,487 B2 | 1/2005 | Burgner |
| 6,861,809 B2 | 3/2005 | Stam |
| 6,902,307 B2 | 6/2005 | Strazzanti |
| 6,912,001 B2 | 6/2005 | Okamoto et al. |
| 6,913,375 B2 | 7/2005 | Strazzanti |
| 6,923,080 B1 | 8/2005 | Dobler et al. |
| 6,930,737 B2 | 8/2005 | Weindorf et al. |
| 6,946,978 B2 | 9/2005 | Schofield |
| 7,012,543 B2 | 3/2006 | Deline et al. |
| 7,038,577 B2 | 5/2006 | Pawlicki et al. |
| 7,046,448 B2 | 5/2006 | Burgner |
| 7,175,291 B1 | 2/2007 | Li |
| 7,255,465 B2 | 8/2007 | Deline et al. |
| 7,262,406 B2 | 8/2007 | Heslin et al. |
| 7,265,342 B2 | 9/2007 | Heslin et al. |
| 7,292,208 B1 | 11/2007 | Park et al. |
| 7,311,428 B2 | 12/2007 | Deline et al. |
| 7,321,112 B2 | 1/2008 | Stam et al. |
| 7,360,932 B2 | 4/2008 | Uken et al. |
| 7,417,221 B2 | 8/2008 | Creswick et al. |
| 7,446,650 B2 | 11/2008 | Scholfield et al. |
| 7,467,883 B2 | 12/2008 | Deline et al. |
| 7,468,651 B2 | 12/2008 | Deline et al. |
| 7,505,047 B2 | 3/2009 | Yoshimura |
| 7,533,998 B2 | 5/2009 | Schofield et al. |
| 7,548,291 B2 | 6/2009 | Lee et al. |
| 7,565,006 B2 | 7/2009 | Stam et al. |
| 7,567,291 B2 | 7/2009 | Bechtel et al. |
| 7,579,940 B2 | 8/2009 | Schofield et al. |
| 7,653,215 B2 | 1/2010 | Stam |
| 7,658,521 B2 | 2/2010 | Deline et al. |
| 7,683,326 B2 | 3/2010 | Stam et al. |
| 7,711,479 B2 | 5/2010 | Taylor et al. |
| 7,719,408 B2 | 5/2010 | DeWard et al. |
| 7,720,580 B2 | 5/2010 | Higgins-Luthman |
| 7,815,326 B2 | 10/2010 | Blank et al. |
| 7,877,175 B2 | 1/2011 | Higgins-Luthman |
| 7,881,839 B2 | 2/2011 | Stam et al. |
| 7,888,629 B2 | 2/2011 | Heslin et al. |
| 7,914,188 B2 | 3/2011 | Deline et al. |
| 7,972,045 B2 | 7/2011 | Schofield |
| 7,994,471 B2 | 8/2011 | Heslin et al. |
| 8,031,225 B2 | 10/2011 | Watanabe et al. |
| 8,045,760 B2 | 10/2011 | Stam et al. |
| 8,059,235 B2 | 11/2011 | Utsumi et al. |
| 8,063,753 B2 | 11/2011 | Deline et al. |
| 8,090,153 B2 | 1/2012 | Schofield et al. |
| 8,100,568 B2 | 1/2012 | Deline et al. |
| 8,116,929 B2 | 2/2012 | Higgins-Luthman |
| 8,120,652 B2 | 2/2012 | Bechtel et al. |
| 8,142,059 B2 | 3/2012 | Higgins-Luthman et al. |
| 8,162,518 B2 | 4/2012 | Schofield |
| 8,201,800 B2 | 6/2012 | Filipiak |
| 8,203,433 B2 | 6/2012 | Deuber et al. |
| 8,217,830 B2 | 7/2012 | Lynam |
| 8,222,588 B2 | 7/2012 | Schofield et al. |
| 8,237,909 B2 | 8/2012 | Ostreko et al. |
| 8,258,433 B2 | 9/2012 | Byers et al. |
| 8,282,226 B2 * | 10/2012 | Blank ............... B60R 1/12 359/879 |
| 8,325,028 B2 | 12/2012 | Schofield et al. |
| 8,482,683 B2 | 7/2013 | Hwang et al. |
| 2001/0019356 A1 | 9/2001 | Takeda et al. |
| 2001/0022616 A1 | 9/2001 | Rademacher et al. |
| 2001/0026316 A1 | 10/2001 | Senatore |
| 2001/0045981 A1 | 11/2001 | Gloger et al. |
| 2002/0040962 A1 | 4/2002 | Schofield et al. |
| 2002/0044065 A1 | 4/2002 | Quist et al. |
| 2002/0154379 A1 * | 10/2002 | Tonar ............... B60Q 1/2665 359/267 |
| 2002/0191127 A1 | 12/2002 | Roberts et al. |
| 2003/0002165 A1 | 1/2003 | Mathias et al. |
| 2003/0007261 A1 | 1/2003 | Hutzel et al. |
| 2003/0016125 A1 | 1/2003 | Lang et al. |
| 2003/0016287 A1 | 1/2003 | Nakayama et al. |
| 2003/0025596 A1 | 2/2003 | Lang et al. |
| 2003/0025597 A1 | 2/2003 | Schofield |
| 2003/0030546 A1 | 2/2003 | Tseng |
| 2003/0030551 A1 | 2/2003 | Ho |
| 2003/0030724 A1 | 2/2003 | Okamoto |
| 2003/0035050 A1 | 2/2003 | Mizusawa |
| 2003/0043269 A1 | 3/2003 | Park |
| 2003/0052969 A1 | 3/2003 | Satoh et al. |
| 2003/0058338 A1 | 3/2003 | Kawauchi et al. |
| 2003/0067383 A1 | 4/2003 | Yang |
| 2003/0076415 A1 | 4/2003 | Strumolo |
| 2003/0080877 A1 | 5/2003 | Takagi et al. |
| 2003/0085806 A1 | 5/2003 | Samman et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0098908 A1 | 5/2003 | Misaiji et al. |
| 2003/0103141 A1 | 6/2003 | Bechtel et al. |
| 2003/0103142 A1 | 6/2003 | Hitomi et al. |
| 2003/0117522 A1 | 6/2003 | Okada |
| 2003/0122929 A1 | 7/2003 | Minaudo et al. |
| 2003/0122930 A1 | 7/2003 | Schofield et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0202357 A1 | 10/2003 | Strazzanti |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 2/2004 | Lin |
| 2004/0032321 A1 | 2/2004 | McMahon et al. |
| 2004/0036768 A1 | 2/2004 | Green |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0080404 A1 | 4/2004 | White |
| 2004/0080431 A1 | 4/2004 | White |
| 2004/0085196 A1 | 5/2004 | Milelr et al. |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0107030 A1 | 6/2004 | Nishira et al. |
| 2004/0107617 A1 | 6/2004 | Shoen et al. |
| 2004/0109060 A1 | 6/2004 | Ishii |
| 2004/0114039 A1 | 6/2004 | Ishikura |
| 2004/0119668 A1 | 6/2004 | Homma et al. |
| 2004/0125905 A1 | 7/2004 | Vlasenko et al. |
| 2004/0202001 A1 | 10/2004 | Roberts et al. |
| 2005/0140855 A1 | 6/2005 | Utsumi |
| 2005/0237440 A1 | 10/2005 | Sugimura et al. |
| 2006/0007550 A1 | 1/2006 | Tonar et al. |
| 2006/0115759 A1 | 6/2006 | Kim et al. |
| 2006/0139953 A1 | 6/2006 | Chou et al. |
| 2006/0158899 A1 | 7/2006 | Ayabe et al. |
| 2006/0262569 A1 * | 11/2006 | Kim ............... G02F 1/133615 362/626 |
| 2007/0171037 A1 | 7/2007 | Schofield et al. |
| 2008/0013153 A1 * | 1/2008 | McCabe ............... B60R 1/12 359/267 |
| 2008/0068520 A1 | 3/2008 | Minikey, Jr. et al. |
| 2008/0192132 A1 | 8/2008 | Bechtel et al. |
| 2008/0247192 A1 | 10/2008 | Hoshi et al. |
| 2008/0294315 A1 | 11/2008 | Breed |
| 2009/0015736 A1 * | 1/2009 | Weller ............... B60R 1/12 349/11 |
| 2009/0141516 A1 | 6/2009 | Wu et al. |

(56) References Cited

U.S. PATENT DOCUMENTS

| | | | |
|---|---|---|---|
| 2010/0201896 | A1 | 8/2010 | Ostreko et al. |
| 2013/0028473 | A1 | 1/2013 | Hilldore et al. |
| 2013/0279014 | A1 | 10/2013 | Fish, Jr. et al. |
| 2014/0347488 | A1 | 11/2014 | Tazaki et al. |

FOREIGN PATENT DOCUMENTS

| | | |
|---|---|---|
| GB | 2338363 | 12/1999 |
| JP | 1178693 | 3/1999 |
| JP | 2005148119 | 6/2005 |
| JP | 2005327600 | 11/2005 |
| JP | 2008139819 A | 6/2008 |
| WO | 9621581 | 7/1996 |
| WO | 2007103573 A2 | 9/2007 |
| WO | 2010090964 A1 | 8/2010 |

OTHER PUBLICATIONS

Adler, "A New Automotive AMLCD Module," Proceedings of the Vehicle Display Symposium, Nov. 2, 1995, pp. 67-71, Society for Information Display, Detroit Chapter, Santa Ana, CA.

Sayer, et al., "In-Vehicle Displays for Crash Avoidance and Navigation Systems,"Proceedings of the Vehicle Display Symposium, Sep. 18, 1996, pp. 39-42, Society for Information Display, Detroit Chapter, Santa Ana, CA.

Knoll, et al., "Application of Graphic Displays in Automobiles," SID 87 Digest, 1987, pp. 41-44, 5A.2.

Terada, et al., "Development of Central Information Display of Automotive Application," SID 89 Digest, 1989, pp. 192-195, Society for Information Display, Detroit Center, Santa Ana, CA.

Thomsen, et al., "AMLCD Design Considerations for Avionics and Vetronics Applications," Proceedings of the 5th Annual Flat Panel Display Strategic and Technical Symposium, Sep. 9-10, 1998, pp. 139-145, Society for Information Display, Metropolitan Detroit Chapter, CA.

Knoll, et al., "Conception of an Integrated Driver Information System," SID International Symposium Digest of Technical Papers, 1990, pp. 126-129, Society for Information Display, Detroit Center, Santa Ana, CA.

Vincen, "An Analysis of Direct-View FPDs for Automotive Multi-Media Applications,"Proceedings of the 6th Annual Strategic and Technical Symposium "Vehicular Applications of Displays and Microsensors," Sep. 22-23, 1999, pp. 39-46, Society for Information Display, Metropolitan Detroit Chapter, San Jose, CA.

Zuk, et al., "Flat Panel Display Applications in Agriculture Equipment," Proceedings of the 5th Annual Flat Panel Display Strategic and Technical Symposium, Sep. 9-10, 1998, pp. 125-130, Society for Information Display, Metropolitan Detroit Chapter, CA.

Vijan, et al., "A 1.7-Mpixel Full-Color Diode Driven AM-LCD," SID International Symposium, 1990, pp. 530-533, Society for Information Display, Playa del Rey, CA.

Vincen, "The Automotive Challenge to Active Matrix LCD Technology," Proceedings of the Vehicle Display Symposium, 1996, pp. 17-21, Society for Information Display, Detroit Center, Santa Ana, CA.

Corsi, et al., "Reconfigurable Displays Used as Primary Automotive Instrumentation," SAE Technical Paper Series, 1989, pp. 13-18, Society of Automotive Engineers, Inc., Warrendale, PA.

Schumacher, "Automotive Display Trends," SID 96 Digest, 1997, pp. 1-6, Delco Electronics Corp., Kokomo, IN.

Knoll, "The Use of Displays in Automotive Applications," Journal of the SID 5/3 1997, pp. 165-172, 315-316, Stuttgart, Germany.

Donofrio, "Looking Beyond the Dashboard," SID 2002, pp. 30-34, Ann Arbor, MI.

Stone, "Automotive Display Specification," Proceedings of the Vehicle Display Symposium, 1995, pp. 93-96, Society for Information Display, Detroit Center, Santa Ana, CA.

\* cited by examiner

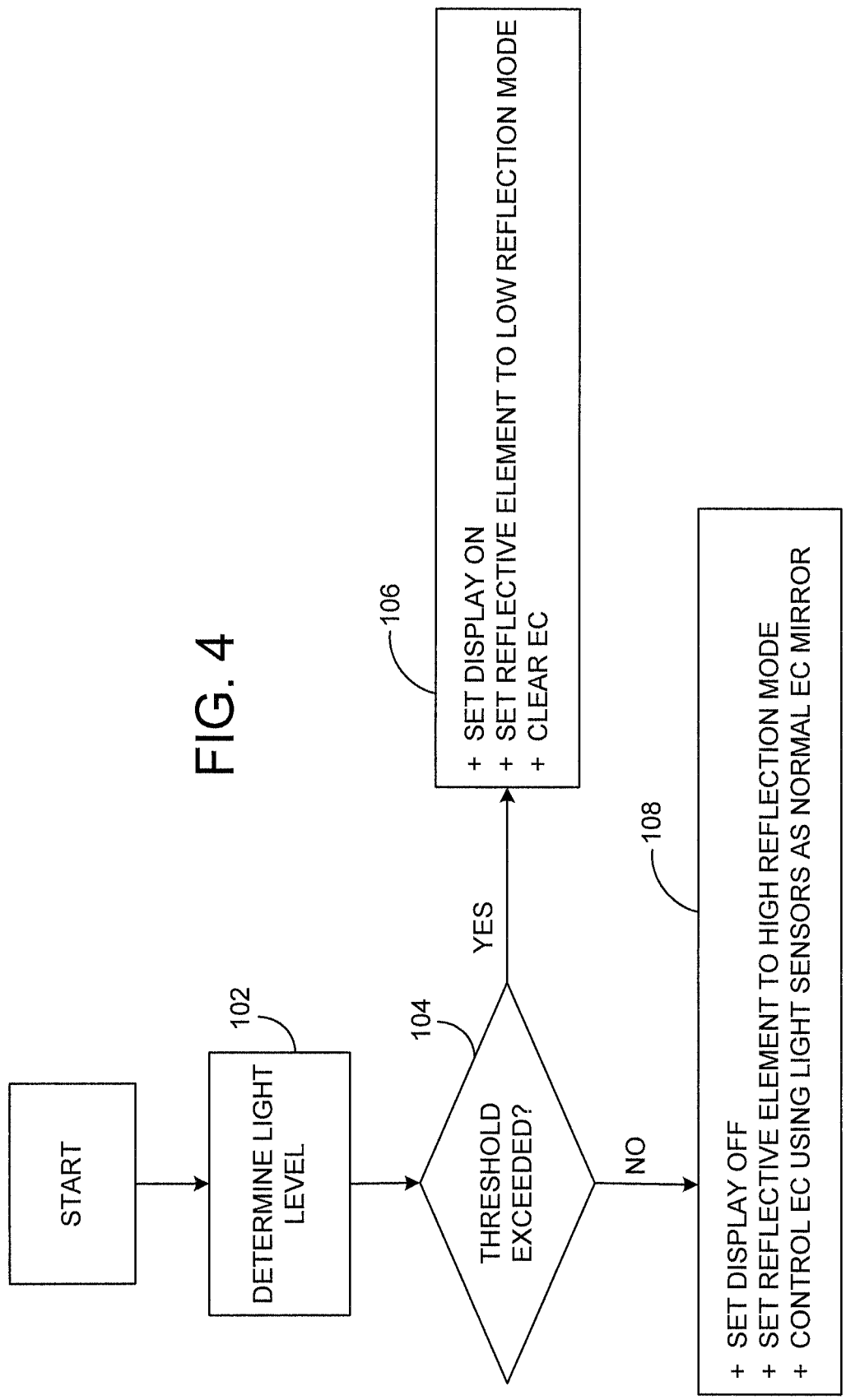

AUTOMATIC DISPLAY MIRROR ASSEMBLY

CROSS-REFERENCE TO RELATED APPLICATION

This application claims priority to and the benefit under 35 U.S.C. §119(e) of U.S. Provisional Patent Application No. 61/973,447, filed on Apr. 1, 2014, entitled "AUTOMATIC DISPLAY MIRROR ASSEMBLY," the entire disclosure of which is hereby incorporated herein by reference.

FIELD OF THE INVENTION

The present invention generally relates to a rearview mirror assembly for a vehicle, and more particularly, a display mirror assembly where scenes to the rear of the vehicle are either reflected to the driver's eyes or are captured by a rearward facing camera and displayed to the driver.

SUMMARY OF THE INVENTION

According to one aspect of the present invention, a display mirror assembly for a vehicle includes an ambient light sensor for sensing an ambient light level and outputting an ambient light signal representative of the sensed ambient light level; a switchable reflective element that changes states between a high reflection mode and a low reflection mode; an electrochromic cell positioned in front of the switchable reflective element for variably attenuating light reflected from the switchable reflective element; a display positioned behind the switchable reflective element for generating a displayed image visible through the switchable reflective element and the electrochromic cell; and a controller in communication with the ambient light sensor, the electrochromic cell, the switchable reflective element, and the display. The controller compares the ambient light signal to a threshold level, wherein, if the ambient light signal exceeds the threshold level, the controller activates the display, sets the switchable reflective element to the low reflection mode and sets the electrochromic cell to a clear state with minimum attenuation, and if the ambient light signal does not exceed the threshold level, the controller deactivates the display, sets the switchable reflective element to the high reflection mode, and varies attenuation by the electrochromic cell.

According to another aspect of the present invention, a display mirror assembly for a vehicle includes an ambient light sensor for sensing an ambient light level and outputting an ambient light signal representative of the sensed ambient light level; a switchable reflective element that changes states between a high reflection mode and a low reflection mode; a display positioned behind the switchable reflective element for generating a displayed image visible through the switchable reflective element; and a controller in communication with the ambient light sensor, the switchable reflective element, and the display, the controller compares the ambient light signal to a threshold level wherein, if the ambient light signal exceeds the threshold level, the controller activates the display and sets the switchable reflective element to the low reflection mode, and if the ambient light signal does not exceed the threshold level, the controller deactivates the display and sets the switchable reflective element to the high reflection mode.

According to another aspect of the present invention, a display mirror assembly for a vehicle includes a switchable reflective element disposed in the housing for changing states between a high reflection mode and a low reflection mode; a display positioned in the housing behind the switchable reflective element for generating a displayed image visible through the switchable reflective element; and an actuator device for moving the switchable reflective element between two distinct viewing positions including a first viewing position and a second viewing position, wherein a primary reflected image of a rearward scene is reflected from the switchable reflective element wherein, when in the first viewing position, the switchable reflective element is positioned to reflect the primary reflected image towards a viewer's eyes, when in the second viewing position, the switchable reflective element is positioned such that a reflected image of a headliner of the vehicle is reflected towards the viewer's eyes and the primary reflected image is not reflected towards the viewer's eyes, and the display is turned on when the switchable reflective element is in the second viewing position and is turned off when the switchable reflective element is in the first viewing position.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein:

FIG. 4 is a flow chart illustrating a process performed by the controller shown in FIG. 3;

DETAILED DESCRIPTION

Figure 1A:
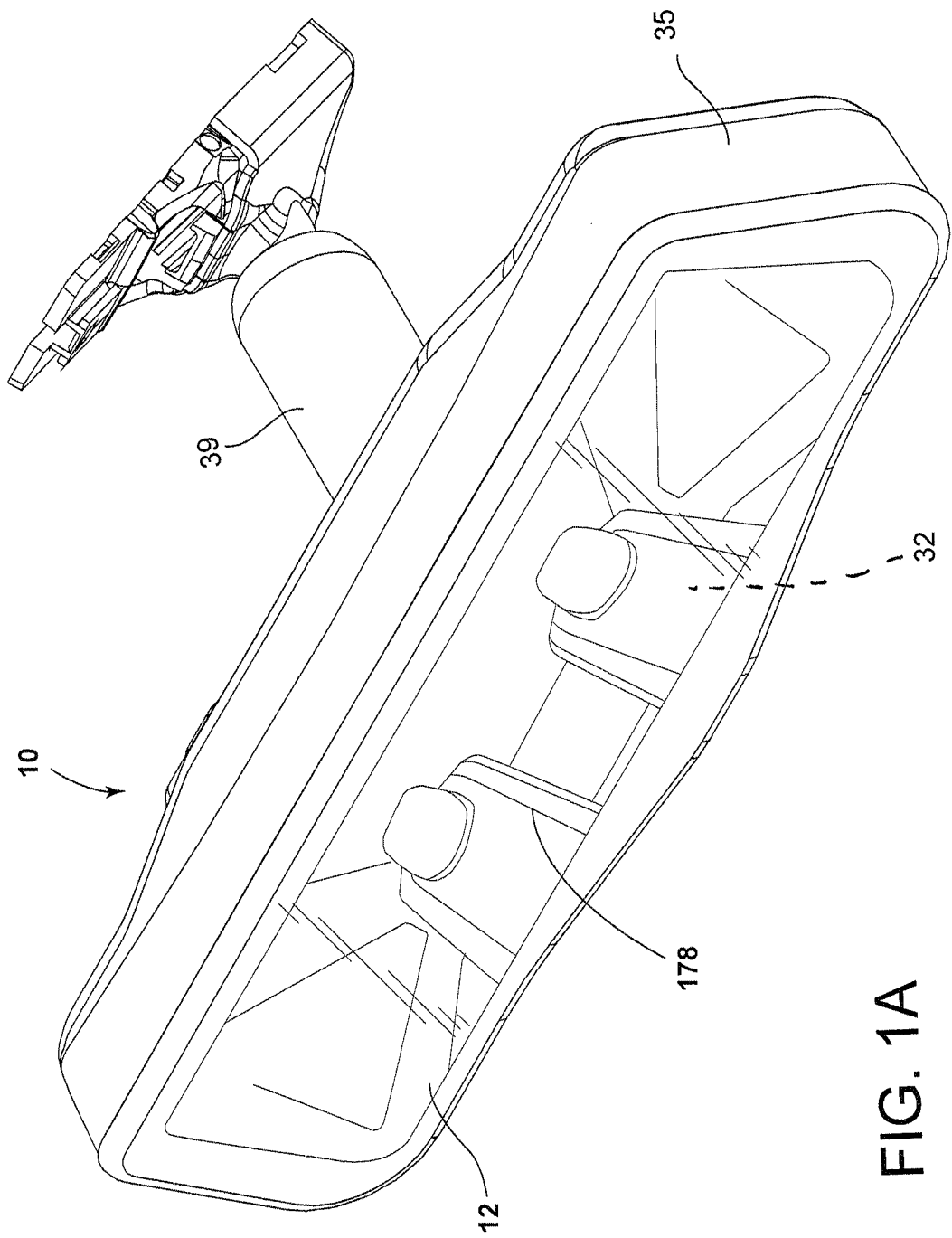
FIG. 1A is a top front perspective view of a display mirror assembly for a vehicle, in accordance with one embodiment of the present invention.

The present illustrated embodiments reside primarily in combinations of method steps and apparatus components related to a rearview mirror assembly. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element preceded by "comprises . . . a" does not, without more constraints, preclude the existence of additional identical elements in the process, method, article, or apparatus that comprises the element.

Referring now to the drawings, reference numeral 10 generally designates a display mirror assembly for a vehicle. Display mirror assembly 10 includes an electrochromic cell 12, an electrically switchable reflective element 20, a display module 30, and a controller 50. A housing 35 at least partially receives electrochromic cell 12, switchable reflective element 20, and display module 30, and includes a mounting member 39 extending rearwardly therefrom. The mounting member 39 is adapted for mounting on a windshield or header of a vehicle. The mounting member 39 may be operably engaged with the rear housing 35 in any known manner. Examples of a display mirror are described in U.S. Pat. No. 8,879,139; U.S. Provisional Patent Application Ser. No. 61/637,527 filed on Apr. 24, 2012; U.S. Provisional Patent Application Ser. No. 61/764,341 filed on Feb. 13, 2013; and United States Patent Application Publication Nos. US 2014/0268351 A1 and US 2013/0279014 A1, all of which are hereby incorporated herein by reference in their entirety.

By way of explanation and not limitation, in operation, the display mirror assembly 10 can be used as a full display mirror in a vehicle to be operational substantially continuously while driving, as opposed to back-up display systems that are used only during certain times of vehicle operation (i.e., when the vehicle is in reverse gear).

Display mirror assembly 10 may be operated in a mirror mode or a display mode. In the mirror mode, display module 30 is off, and switchable reflective element 20 is set to a high reflective state so as to reflect light from a rearward scene to the driver's eyes. The amount of reflected light may be variably controlled using electrochromic cell 12. In the display mode, display module 30 is on and switchable reflective element 20 is set to a low reflective, high transmission state so as to allow light from display module 30 to pass therethrough and to not reflect light much light from the rearward scene to the driver's eyes. In addition, electrochromic cell 12 may be set in a clear (or highly transmissive state). In this manner, the amount of light reflected from the rearward scene is kept at a level that does not interfere with the driver's view of the displayed images generated from display module 30.

The display mode and mirror mode may be automatically selected by controller 50 in response to a detected light level. Thus, for example, if night-time conditions are detected, a mirror mode may be automatically selected and if daytime conditions are detected, a display mode may be automatically selected. In this manner, the display would not be used during night-time conditions when the rearward facing camera may exhibit substantial blooming and smear from trailing vehicle headlights. Further, by providing electrochromic cell 12, the glare from reflections of such trailing vehicle headlights may be reduced, and thus the mirror mode may provide a superior view of the rearward scene as compared to that provided by some camera systems.

Figure 2:
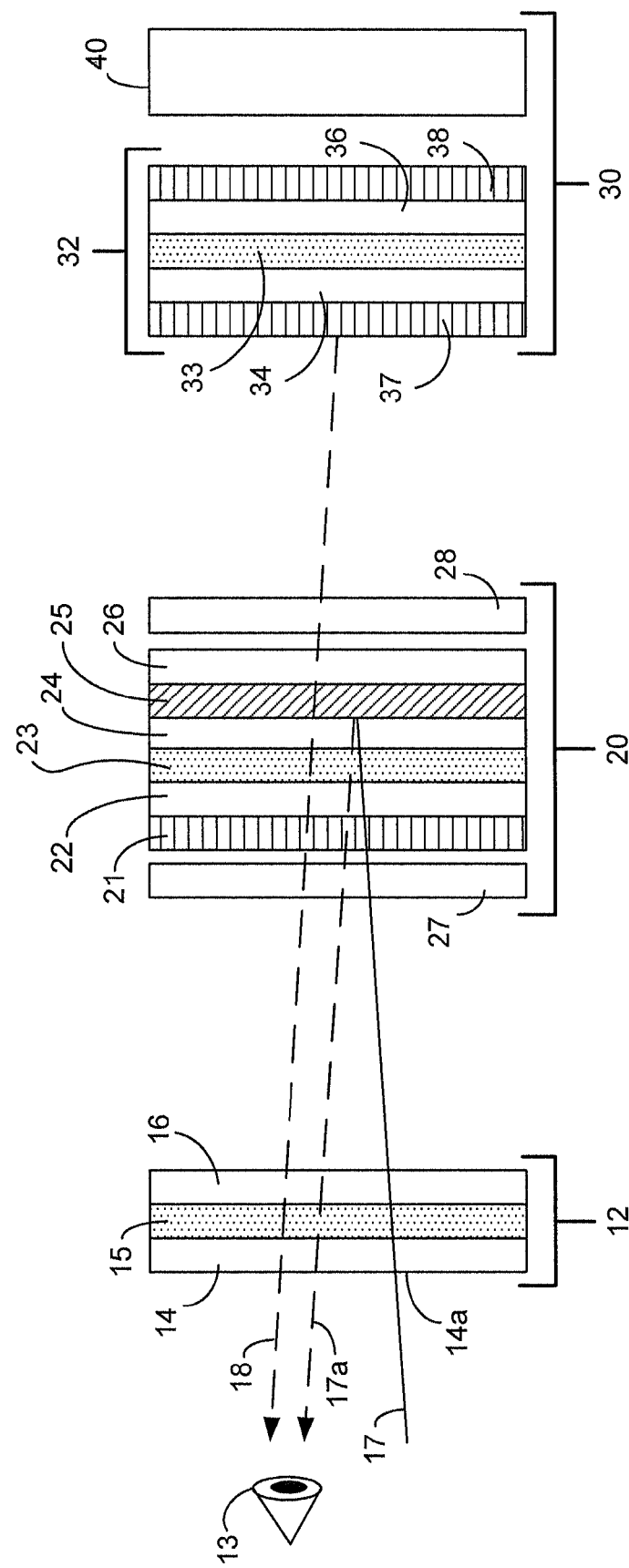
FIG. 2 is a schematic illustration of the optical components of the display mirror assembly of FIG. 1.

As shown in FIG. 2, which shows portions of display mirror assembly 10 in an exaggerated exploded view that is not to scale, electrochromic cell 12 includes a front transparent substrate 14, a rear transparent substrate 16, and an electrochromic medium 15 disposed therebetween. A front surface 14a of front substrate 14 may serve as the exposed front surface of display mirror assembly 10. Transparent substrates 14 and 16 have transparent electrical conductors (not shown) coated on opposed surfaces such that a voltage may be applied across the electrochromic medium in a known manner. Electrochromic cell 12 may have any known construction. Electrochromic cell 12 variably attenuates light passing therethrough in response to the voltage applied across the transparent electrical conductors.

Switchable reflective element 20 may include a liquid crystal material 23 disposed between two glass substrates 22 and 24. A polarizer 21 may be provided on a front surface of glass substrate 22. A reflective polarizer 25 may be provided on a rear surface of glass substrate 24. An additional glass substrate 26 may be provided on a rear surface of reflective polarizer 25. Suitable constructions for switchable reflective element 20 are disclosed in United States Patent Application Publication Nos. US 2010/0277786 A1 and US 2014/0268351 A1, the entire disclosures of which are incorporated herein by reference. As disclosed in the latter of these publications, anti-reflective layers or prismatic wedges 27 and 28 may be provided on the front and rear surfaces of switchable reflective element 20. In general, switchable reflective element 20 is responsive to an electrical signal applied thereto to change between a high reflection state and a low reflection state (with high light transmission).

Figure 3:
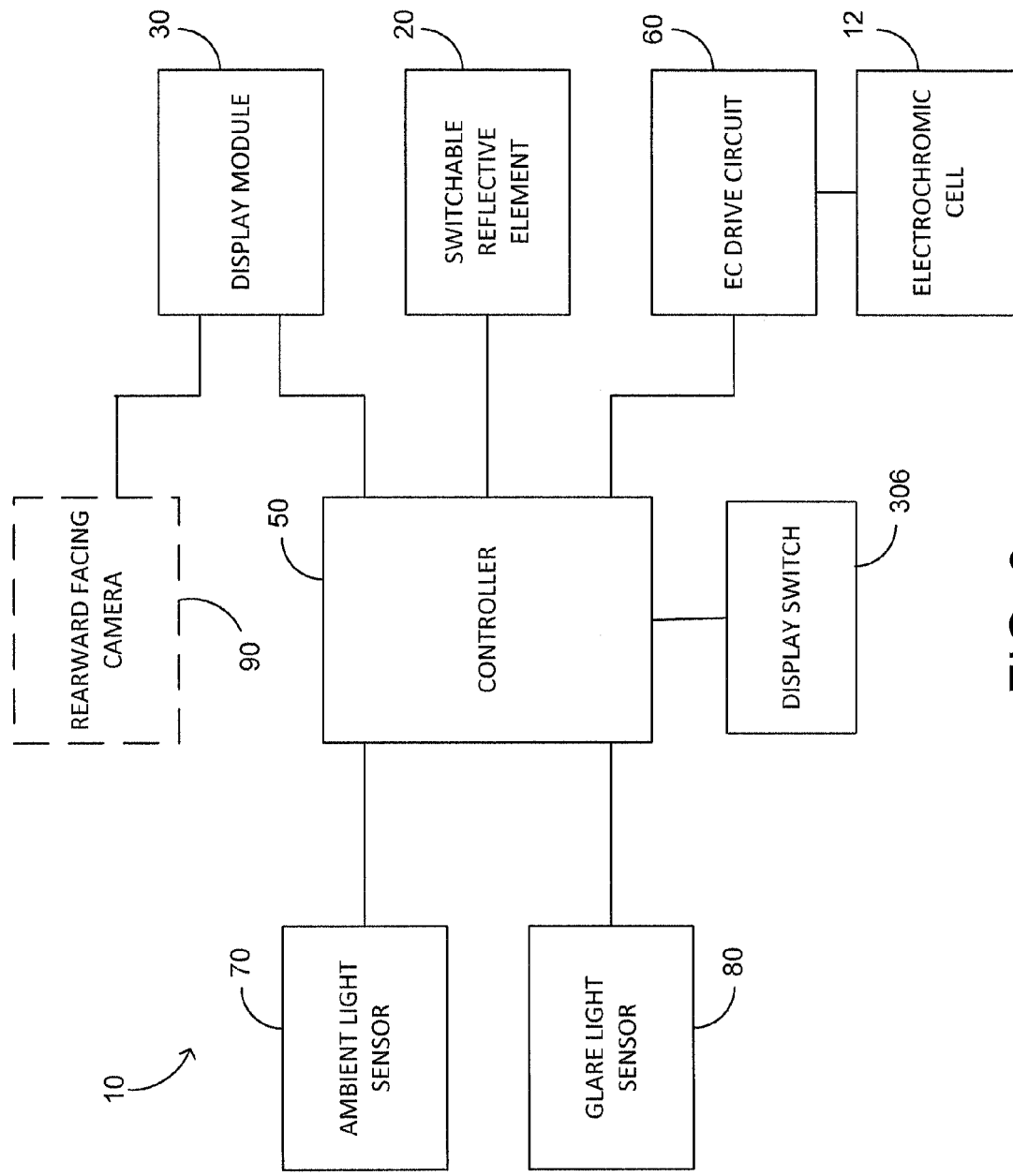
FIG. 3 is an electrical circuit diagram in block form showing the electrical components of the display mirror assembly of FIG. 1.

Display module 30 includes appropriate display driver circuitry for displaying video images captured by a rearward facing camera 90 (FIG. 3). Display module 30 includes a display element 32 and a backlight 40. Display element 32 may include a liquid crystal material 33 disposed between glass substrates 34 and 36, a front polarizer 37 provided on a front surface of glass substrate 34, and a rear polarizer 38 provided on a rear surface of glass substrate 36. Display element 32 and backlight 40 may have any known construction. Display element 32 may be constructed as disclosed in United States Patent Application Publication No. US 2014/0268355 A1, the disclosure of which is hereby incorporated by reference. Backlight 40 may be constructed as disclosed in U.S. patent application Ser. No. 14/609,826, entitled "BACKLIGHTING ASSEMBLY FOR DISPLAY FOR REDUCING CROSS-HATCHING," filed by John A. VanderPloeg on Jan. 30, 2015, and U.S. Provisional Application No. 62/106,341, entitled "LOW COST OPTICAL FILM STACK," filed by John A. VanderPloeg et al. on Jan. 22, 2015, the disclosures of which are hereby incorporated by reference.

Referring to FIG. 2, the front polarizer 37 of display module 30 may be a linear polarizer affixed to glass substrate 34 such that light exiting the display module 30 is linearly polarized. The non-extinguishing or high transmission axis of front polarizer 37 may be aligned to the non-reflecting or high transmission axis of reflective polarizer 25 of switchable reflective element 20. The reflective or low transmission axis of reflective polarizer 25 may be orthogonal from the non-reflective or high transmission axis, as is commonly known in the art. Reflective polarizer 25 may be fixed between glass substrates 24 and 26 such that a substantially specular reflective layer can be achieved as disclosed in U.S. Pat. Nos. 7,502,156; 8,282,224; and 8,545,030 and in United States Patent Application Publication No. US 2010/0277786 A1, the entire disclosures of which are incorporated herein by reference. Liquid crystal 23, together with glass substrates 22 and 24, may comprise a twisted nematic LCD cell, as is commonly known in the art. Polarizer 21 may be a linear polarizer affixed to glass substrate 22 such that the non-extinguishing or high transmission axis of polarizer 21 may be aligned to the non-reflecting or high transmission axis of reflective polarizer 25. Thus, the high transmission polarization axis of polarizer 21, reflective polarizer 25, and front polarizer 37 may all be aligned, whereas the reflecting or low transmission axis of reflective polarizer 25 may be orthogonal to this axis.

Display mirror assembly 10 may be operable in the mirror mode when the display module 30 is off, such that backlight 40 is not activated or display element 32 is not activated, or both backlight 40 and display element 32 are not activated. Switchable reflective element 20 may be in a high reflectance state, whereby an electrical signal is not applied to liquid crystal material 23, such that the 90-degree rotation of polarized light indicative of the twisted nematic LCD remains intact, as is commonly known in the art. An electrical signal may be applied to electrochromic cell 12 to attenuate light transmitting through electrochromic cell 12 to switchable reflective element 20.

Thus, display mirror assembly 10 is operable in the mirror mode when incident light, which may or may not be attenuated by electrochromic cell 12, proceeds to polarizer 21. A portion of the light incident on polarizer 21 passes in a linearly polarized fashion through to liquid crystal material 23. Substantially all of the light incident on liquid crystal material 23 may rotate 90 degrees as it passes through and proceeds to reflective polarizer 25. Light incident on reflective polarizer 25 may be aligned to its reflecting axis, whereby reflective polarizer 25 may reflect substantially all of the incident polarized light. Light reflected from reflective polarizer 25 may remain linearly polarized and proceed in reverse, whereby substantially all of the polarized light incident back on liquid crystal material 23 may rotate 90 degrees and pass through polarizer 21 substantially uninhibited and may or may not be attenuated by electrochromic cell 12 upon exiting display mirror assembly 10.

Display mirror assembly 10 may be operable in the display mode when the display module 30 is on, such that backlight 40 is activated or display element 32 is activated, or both backlight 40 and display element 32 are activated. Switchable reflective element 20 may be in a low reflectance state, whereby an electrical signal is applied to liquid crystal material 23, such that the 90-degree rotation of polarized light indicative of the twisted nematic LCD is temporarily disabled, as is commonly known in the art. An electrical signal may or may not be applied to electrochromic cell 12. If not applied, this avoids attenuating light transmitting from display module 30. Thus, display mirror assembly 10 may be operable in the display mode when linearly polarized light exiting front polarizer 37 passes substantially uninhibited through the non-reflecting or high transmission axis of reflective polarizer 25, and passes substantially uninhibited through liquid crystal 23, and passes substantially uninhibited through polarizer 21.

Further, when display mirror assembly 10 is operable in the display mode, incident light, which may be, but is preferably not attenuated by electrochromic cell 12, proceeds to polarizer 21. A portion of the light incident on polarizer 21 passes in a linearly polarized fashion through to liquid crystal material 23. Substantially all of the light incident on liquid crystal material 23 passes through and proceeds to reflective polarizer 25 because the 90-degree rotation of polarized light indicative of the twisted nematic LCD may be temporarily disabled. Light incident on reflective polarizer 25 may be aligned to its non-reflecting axis, whereby reflective polarizer 25 may absorb substantially all of the incident polarized light. As previously mentioned, anti-reflective layers or prismatic wedges 27 and 28 may be provided on the front and rear surfaces of switchable reflective element 20.

Referring back to FIGS. 1B and 1C, display mirror assembly 10 has a viewing area, which includes a front surface 14*a* of a front transparent substrate 14 of electrochromic element 12. The viewing area may be a rectangular shape, a trapezoidal shape, or any custom contoured shape desired for aesthetic reasons. The perimeter of electrochromic element 12 may also have a ground edge, a beveled edge, or be frameless.

Display element 32 may be generally planar, with outer edges defining a front surface. The front surface of display element 32 can be shaped to correspond to and fit within the shape of the viewing area of display mirror assembly 10. As illustrated in FIG. 1, display element 32 can have a trapezoidal shape. However, it should be appreciated by those skilled in the art that display element 32 can have other shapes, such as, but not limited to, square, rectangular, symmetrical, non-symmetrical, or contoured. Display element 32 may have a front surface which fits within, but is not complementary to, the viewing area of display mirror assembly 10, for example, where the front surface of display element 32 is generally rectangular and the front surface 14*a* of electrochromic cell 12 has a contoured outer perimeter. The distance between the outer edges of display element 32 and the outer perimeter of electrochromic cell 12 may be about 9 mm or less along at least a portion of the outer edges of display element 32. Display element 32 may be a liquid crystal display (LCD), LED, OLED, plasma, DLP or other display technology. Various types of LCDs can be used, including, but not limited to, twisted nematic (TN), in-plane switching (IPS), fringe field switching (FFS), vertically aligned (VA), etc.

FIG. 3 shows an example of the electrical components of display mirror assembly 10. As shown, display mirror assembly 10 further includes a controller 50, an electrochromic drive circuit 60, an ambient light sensor 70, and glare light sensor 80. Ambient light sensor 70 may be positioned on the rear side of housing 35 so as to capture ambient light levels forward of the vehicle. Glare light sensor 80 may be positioned on the front side of housing 35 so as to capture glare light levels incident on the front surface of display mirror assembly 10. An optional display switch 306 may also be provided as described further below with reference to FIGS. 6A and 6B. Controller 50 is coupled to each of these elements to control the operation of display module 30, electrochromic cell 12, and switchable reflective element 20 in response to light levels sensed by ambient light sensor 70 and/or glare light sensor 80. The operation of controller 50 is described further below with reference to FIG. 4.

Electrochromic drive circuit 60 may have the same construction as conventional drive circuits used for electrochromic mirror elements.

As shown in FIG. 4, controller 50 begins this automatic mode selection by determining a light level (step 102). This may be accomplished by reading the output of ambient light sensor 70 and/or glare light sensor 80. Then, in step 104, controller 50 determines if the detected light level has exceeded a threshold level. If the threshold is exceeded (representing daytime conditions), controller 50 automatically selects a display mode by turning on display module 30 so as to generate a display of the rearward scene as captured by rearward facing camera 90, setting switchable reflective element 20 to a low reflection state, and clearing electrochromic cell 12 so as to be in a high transmission state (step 106). If the threshold is not exceeded (representing nighttime conditions), controller 50 automatically selects a mirror mode by turning off display module 30, setting switchable reflective element 20 to a high reflection state, and controlling the transmission level of electrochromic cell 12 using light sensors 70 and 80 in a manner similar to that used for conventional electrochromic mirrors (step 108).

It will be understood by one having ordinary skill in the art that a manual selection method may be employed whereby the driver may manually control the reflection state of the system by pressing a conventional button, switch, lever and the like. Further, the driver may manually select the reflection state of the system through a capacitive touch switch, capacitive touch panel, resistive touch panel, gesture recognition device, proximity sensor, or any human interface device as is commonly known in the art. After manual actuation, the switchable reflective element may switch back to its prior reflective state upon release of the conventional button (or removal of the user's hand from the assembly as sensed by other listed user-actuation mechanisms) or after a predetermined time delay after such release.

Additionally, to provide information to the viewer of the display mirror assembly 10, the display mirror assembly 10 may include information regarding a field of view 178 (FIGS. 1A-1C), such as a partially transmissive graphic overlay or an image on the display module 30 visible on the viewing area when the display module 30 is in use.

Figure 1B:
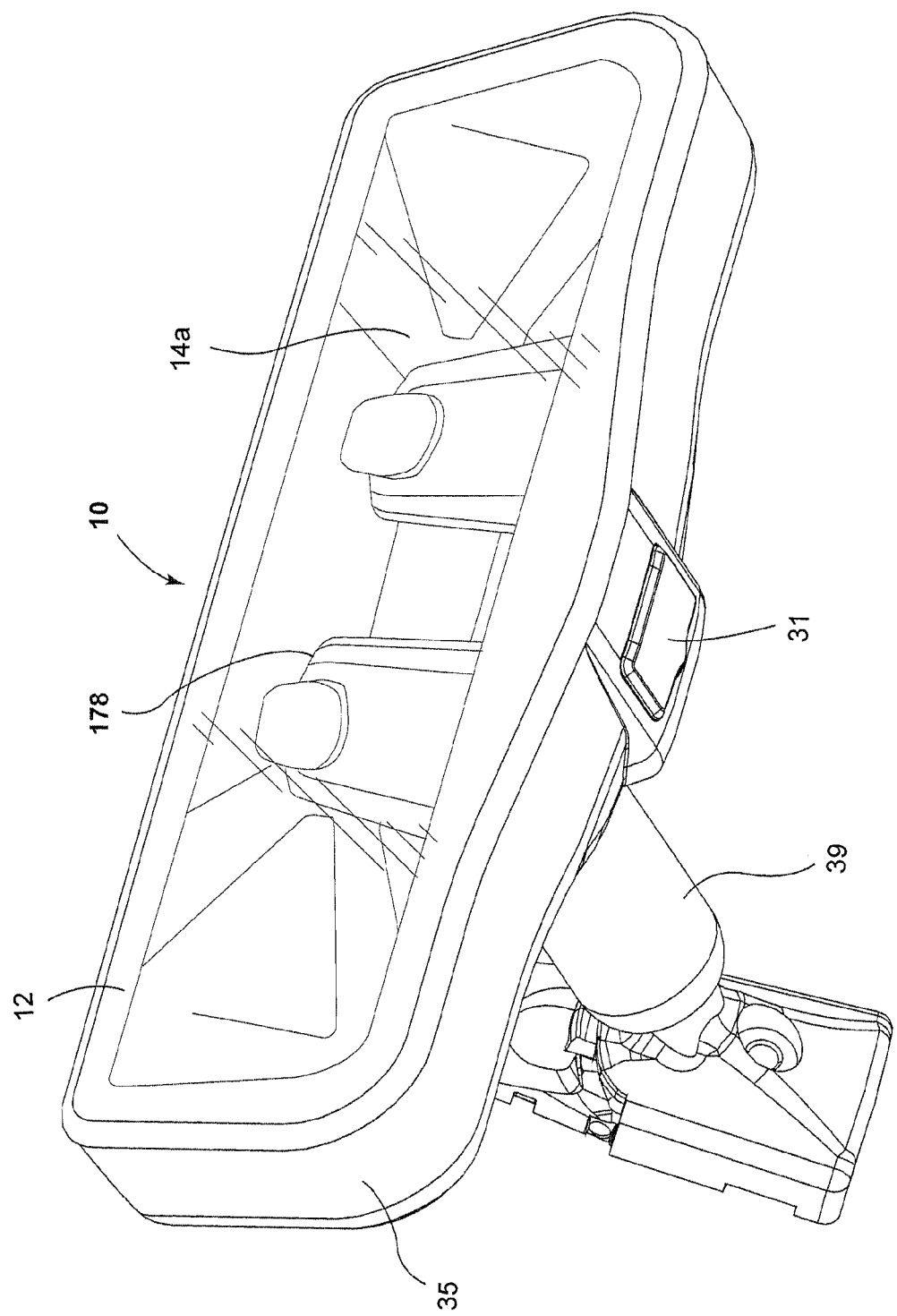
FIG. 1B is a bottom front perspective view of the display mirror assembly of FIG. 1A.
Figure 1C:
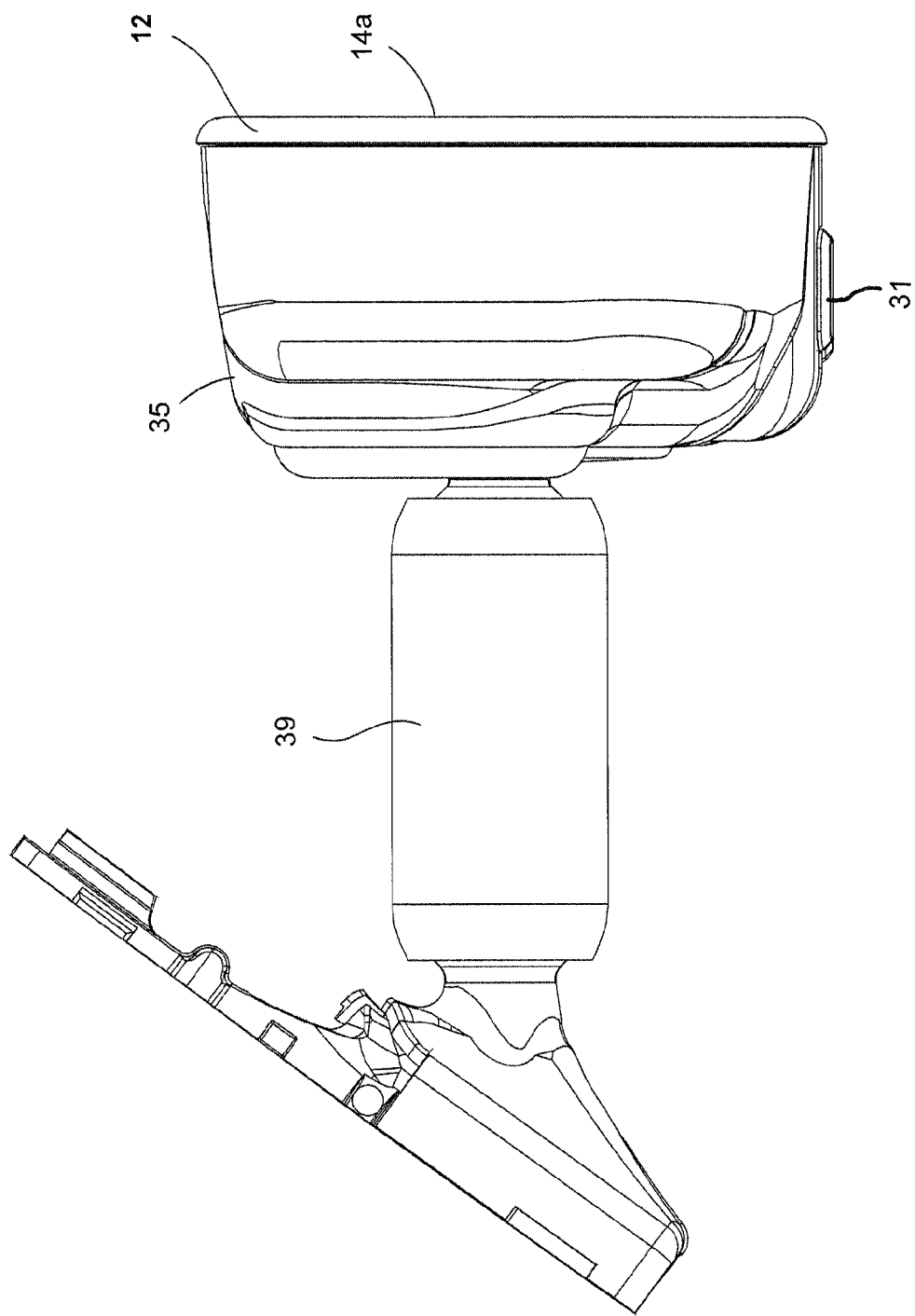
FIG. 1C is a side elevation view of the display mirror assembly of FIG. 1B.
Figure 5B:
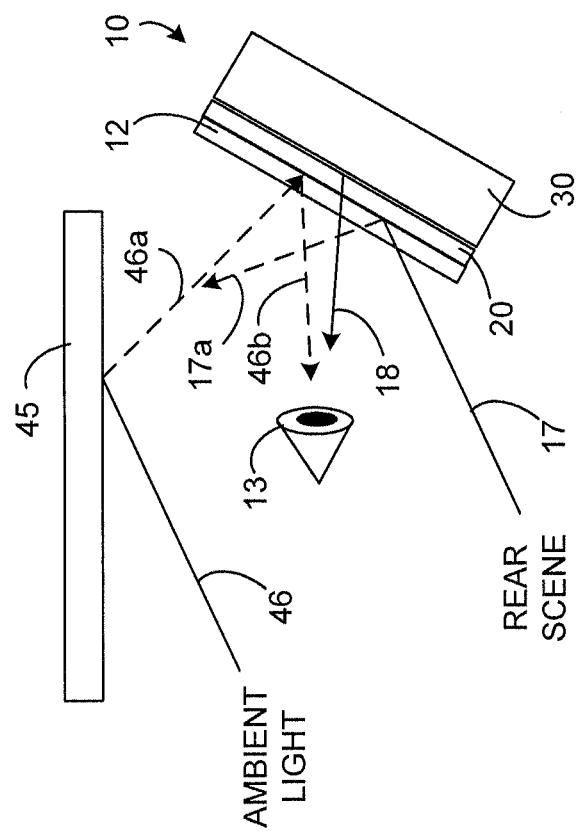
FIG. 5B is a schematic illustration of the optical components of the display mirror assembly of FIGS. 1A-2 shown in a second viewing position.

As shown in FIGS. 1B and 1C, display mirror assembly 10 may include an optional actuator device 31 for moving switchable reflective element 20 and optional electrochromic cell 12 between two distinct viewing positions including a first viewing position (FIG. 5A) and a second viewing position (FIG. 5B). In addition to moving electrochromic cell 12 and switchable reflective element 20, actuator device 31 may also move display module 30 and/or housing 35.

It is contemplated that actuator device 31 may take the form of a conventional actuator device used in prismatic mirrors with the exception that it would be modified to provide for tilting the switchable reflective element 20 and optionally electrochromic cell 12 or a prismatic element. Examples of such actuator devices are described in commonly assigned U.S. Pat. No. 4,443,057; United States Patent Application Publication No. 2015/0085337 A1; and U.S. Provisional Application Nos. 62/121,935, 62/121,915, 62/121,960, and 62/121,983, the entire disclosures of which are incorporated herein by reference. An example of the actuator device of United States Patent Application Publication No. 2015/0085337 A1 is shown in FIGS. 6A and 6B and is described below.

It is also possible to use an automated actuator device such as that disclosed in commonly-assigned U.S. Pat. No. 4,443,057. In this case, the automatic actuator device could move the switchable reflective element 20 and optionally electrochromic cell 12 or a prismatic element between the first and second viewing positions based upon sensed light levels forward and optionally rearward of the display mirror assembly using ambient light sensor 70 and/or glare light sensor 80. The entire disclosure of U.S. Pat. No. 4,443,057 is incorporated herein by reference.

Figure 5A:
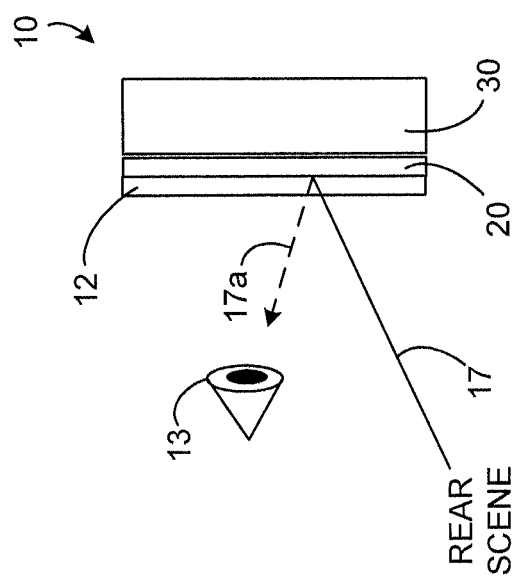
FIG. 5A is a schematic illustration of the optical components of the display mirror assembly of FIGS. 1A-2 shown in a first viewing position.

As shown in FIGS. 2, 5A and 5B, a primary reflected image 17a of a rearward scene 17 is reflected from reflective polarizer 25 of switchable reflective element 20. When in the first viewing position (FIGS. 2 and 5A), switchable reflective element 20 is positioned to reflect the primary reflected image 17a towards a viewer's eyes 13. This is the ideal position when display mirror assembly 10 is operating in the mirror mode. However, in the display mode, even when switchable reflective element 20 is set to a low reflective, high transmission state, a small percent of an image of the rearward scene is still reflected at the driver's eyes 13, which may cause some degree of interference with the image 18 from display module 30. Thus, the second viewing position is provided by way of actuator device 31 wherein electrochromic cell 12 and switchable reflective element 20 are positioned (by tilting upward) such that a reflected image 46b of ambient light 46 reflected 46a from a headliner 45 of the vehicle is reflected towards the viewer's eyes and the primary reflected image 17a of the rearward scene 17 is not reflected towards the viewer's eyes 13. Because the reflected image 46b of the headliner 45 is of a uniform contrast and appearance, it does not interfere with the displayed image 18 from display module 30.

Figure 6A:
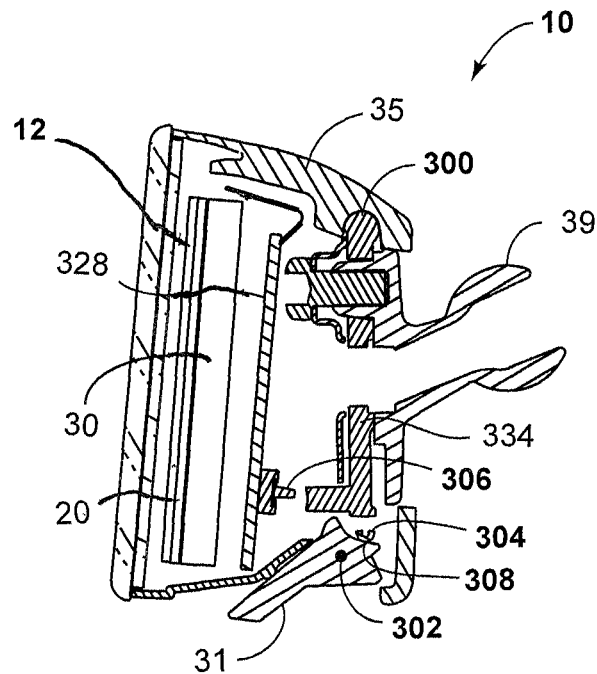
FIG. 6A is a side elevational cross-sectional view of a display mirror assembly with a bi-modal switch in a first position.
Figure 6B:
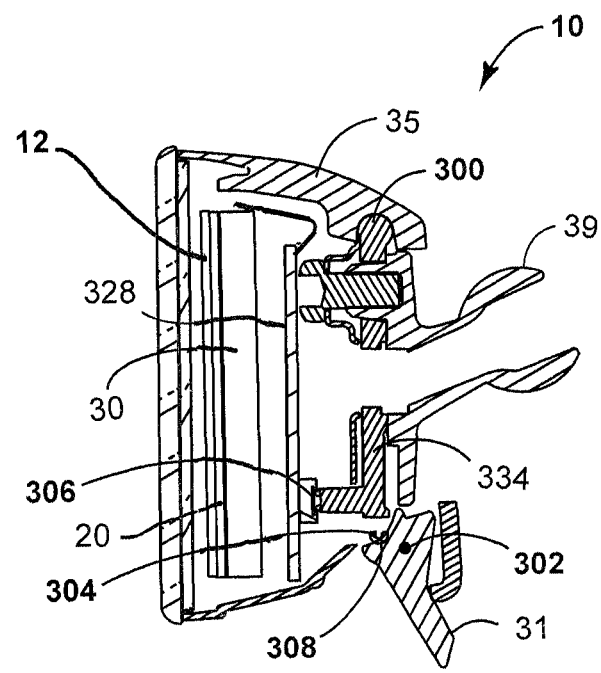
FIG. 6B is a side elevational cross-sectional view of a display mirror assembly with a bi-modal switch in a second position.

With reference to FIGS. 6A and 6B, an actuator device is illustrated in the form of a bi-modal switch 31 whose functionality consists of the interaction between the mounting member 39, a mounting member plate 334, a first pivot axis 300, a second pivot axis 302, a bi-modal switch spring 304, the bi-modal switch 31, a primary PCB 328 (on which controller 50 may be mounted), an optional display switch 306, the rear housing 35, the switchable reflective element 20, the electrochromic cell 12, and the display module 30. In this embodiment, the switchable reflective element 20, the electrochromic cell 12, and the display module 30 are rigidly attached to the rear housing 35. The first pivot axis 300 is defined by a cylindrical rotation member disposed between the rear housing 35 and the mounting member plate 334. The second pivot axis 302 is defined by a cylindrical rotation member disposed between the rear housing 35 and the bi-modal switch 31. The bi-modal switch 31 rotates about the second pivot axis 302 when the bi-modal switch 31 is moved from the on position to the off position. During the rotation of the bi-modal switch 31, the mounting member 39 and the mounting member plate 334 do not move relative to the observer of the display mirror assembly 10. However, the rear housing 35, the switchable reflective element 20, the electrochromic cell 12, the display module 30, and the primary PCB 328 rotate around the first pivot axis 300. The bi-modal switch 31 rotates approximately 75 to 105 degrees around the second pivot axis 302. The distance from the center of the second pivot axis 302 to a spring receiving area 308 of the bi-modal switch 31 and the bi-modal switch spring 304 is fairly small when compared to the distance between the first pivot axis 300 and the spring receiving area 308 between the bi-modal switch 31 and the bi-modal switch spring 304. The difference in distances between the first pivot axis 300 and the second pivot axis 302 causes a rotation of the rear housing 30 of approximately 2 to 7 degrees when the bi-modal switch 31 is rotated 75 to 110 degrees. Optional display switch 306 is rigidly mounted to the primary PCB 328 with a predetermined distance between the mounting member plate 334 and the display switch 306, such that when the bi-modal switch 31 is in the second viewing position (FIG. 6A), the display switch 306 is not depressed and the display module 30 is turned on, and when the bi-modal switch 31 is in the first viewing position (FIG. 6B), the display switch 306 is depressed thereby turning off the display module 30.

With reference again to FIGS. 6A and 6B, the rotation of the bi-modal switch 31 generally performs two functions, the first of which is rotating the switchable reflective element 20 between 2 and 7 degrees, and the second of which is to move the display switch 306 between depressed and not depressed deactivated) positions, which switches the display module 30 off and on, depending on the mode. It should be appreciated, however, that display switch 306 may be eliminated if controller 50 is responsive to ambient light sensed by ambient light sensor 70 to automatically turn display module 30 on and off. On the other hand, if display switch 306 is provided, it may be used to control the state of switchable reflective element 20 and potentially affect the state of electrochromic cell 12. Alternatively, controller 50 may automatically change the mode of display mirror assembly 10 in response to the ambient light and display switch 306 may be used as a manual override.

It will be appreciated that the controller 50 described herein may be comprised of one or more conventional processors and unique stored program instructions that control one or more processors to implement, in conjunction with certain non-processor circuits, some, most, or all of the functions of a display mirror assembly 10, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A display mirror assembly for a vehicle comprising:
an ambient light sensor for sensing an ambient light level and outputting an ambient light signal representative of the sensed ambient light level;
a switchable reflective element that changes states between a high reflection mode and a low reflection mode;
an electrochromic cell positioned in front of said switchable reflective element for variably attenuating light reflected from said switchable reflective element;
a display positioned behind said switchable reflective element for generating a displayed image visible through said switchable reflective element and said electrochromic cell; and
a controller in communication with said ambient light sensor, said electrochromic cell, said switchable reflective element, and said display, said controller compares the ambient light signal to a threshold level, wherein:
if the ambient light signal exceeds the threshold level, said controller activates said display, sets said switchable reflective element to the low reflection mode and sets said electrochromic cell to a clear state with minimum attenuation, and
if the ambient light signal does not exceed the threshold level, said controller deactivates said display, sets said switchable reflective element to the high reflection mode and varies attenuation by said electrochromic cell.

2. The display mirror assembly of claim 1, and further comprising a glare light sensor for sensing glare light levels from the rear of the vehicle, wherein said controller varies attenuation by said electrochromic cell in response to light levels sensed by said glare light sensor.

3. The display mirror assembly of claim 1, and further comprising an anti-reflection coating provided on at least one of the front and rear sides of said switchable reflective element.

4. The rearview mirror assembly of claim 1, wherein said switchable reflective element is a switchable liquid crystal reflective element.

5. The rearview mirror assembly of claim 1, wherein said display is a liquid crystal display.

6. The rearview mirror assembly of claim 1, and further comprising:
a housing configured for attachment to a vehicle and for housing at least said switchable reflective element, said electrochromic cell, and said display; and
an actuator device for moving said switchable reflective element between two distinct viewing positions including a first viewing position and a second viewing position,
wherein a primary reflected image of a rearward scene is reflected from said switchable reflective element,
wherein:
when in the first viewing position, said switchable reflective element is positioned to reflect the primary reflected image towards a viewer's eyes,
when in the second viewing position, said switchable reflective element is positioned such that a reflected image of a headliner of the vehicle is reflected towards the viewer's eyes and the primary reflected image is not reflected towards the viewer's eyes, and
said display is turned on when said switchable reflective element is in the second viewing position and is turned off when said switchable reflective element is in the first viewing position.

7. A display mirror assembly for a vehicle comprising:
an ambient light sensor for sensing an ambient light level and outputting an ambient light signal representative of the sensed ambient light level;
a switchable reflective element that changes states between a high reflection mode and a low reflection mode;
a display positioned behind said switchable reflective element for generating a displayed image visible through said switchable reflective element; and
a controller in communication with said ambient light sensor, said switchable reflective element, and said display, said controller compares the ambient light signal to a threshold level, wherein:
if the ambient light signal exceeds the threshold level, said controller activates said display and sets said switchable reflective element to the low reflection mode, and
if the ambient light signal does not exceed the threshold level, said controller deactivates said display and sets said switchable reflective element to the high reflection mode.

8. The rearview mirror assembly of claim 7, and further comprising an electrochromic cell positioned in front of said switchable reflective element for variably attenuating light reflected from said switchable reflective element.

9. The display mirror assembly of claim 7, and further comprising an anti-reflection coating provided on at least one of the front and rear sides of said switchable reflective element.

10. The rearview mirror assembly of claim 7, wherein said switchable reflective element is a switchable liquid crystal reflective element.

11. The rearview mirror assembly of claim 7, wherein said display is a liquid crystal display.

12. The rearview mirror assembly of claim 7, and further comprising:
a housing configured for attachment to a vehicle and for housing at least said switchable reflective element and said display; and
an actuator device for moving said switchable reflective element between two distinct viewing positions including a first viewing position and a second viewing position,
wherein a primary reflected image of a rearward scene is reflected from said switchable reflective element,
wherein:
when in the first viewing position, said switchable reflective element is positioned to reflect the primary reflected image towards a viewer's eyes,
when in the second viewing position, said switchable reflective element is positioned such that a reflected image of a headliner of the vehicle is reflected towards the viewer's eyes and the primary reflected image is not reflected towards the viewer's eyes, and
said display is turned on when said switchable reflective element is in the second viewing position and is turned off when said switchable reflective element is in the first viewing position.

13. A display mirror assembly for a vehicle comprising:
a housing configured for attachment to a vehicle;
a switchable reflective element disposed in said housing for changing states between a high reflection mode and a low reflection mode;
a display positioned in said housing behind said switchable reflective element for generating a displayed image visible through said switchable reflective element; and
an actuator device for moving said switchable reflective element between two distinct viewing positions including a first viewing position and a second viewing position,
wherein a primary reflected image of a rearward scene is reflected from said switchable reflective element, and
wherein:
when in the first viewing position, said switchable reflective element is positioned to reflect the primary reflected image towards a viewer's eyes,
when in the second viewing position, said switchable reflective element is positioned such that a reflected image of a headliner of the vehicle is reflected towards the viewer's eyes and the primary reflected image is not reflected towards the viewer's eyes, and
said display is turned on when said switchable reflective element is in the second viewing position and is turned off when said switchable reflective element is in the first viewing position.

14. The display mirror assembly of claim 13, wherein said actuator device also moves said display with said switchable reflective element.

15. The display mirror assembly of claim 13, wherein said actuator device also moves said housing with said switchable reflective element.

16. The display mirror assembly of claim 13, and further comprising an electrochromic element disposed in said housing in front of said switchable reflective element for variably attenuating light reflected from said switchable reflective element.

17. The display mirror assembly of claim 16, wherein said actuator device also moves said electrochromic cell with said switchable reflective element.

18. The display mirror assembly of claim 13, wherein said actuator device is a bi-modal switch.

19. The display mirror assembly of claim 13, wherein said housing has an aperture defining a viewing area and wherein said display is configured to display an image having substantially the same size and shape as the viewing area.

20. The display mirror assembly of claim 13, and further comprising:
- an ambient light sensor for sensing an ambient light level and outputting an ambient light signal representative of the sensed ambient light level; and
- a controller in communication with said ambient light sensor, said switchable reflective element, and said display, said controller compares the ambient light signal to a threshold level, wherein:
- if the ambient light signal exceeds the threshold level, said controller activates said display and sets said switchable reflective element to the low reflection mode, and
- if the ambient light signal does not exceed the threshold level, said controller deactivates said display and sets said switchable reflective element to the high reflection mode.

* * * * *